US012543064B2

(12) United States Patent
Feng et al.

(10) Patent No.: US 12,543,064 B2
(45) Date of Patent: Feb. 3, 2026

(54) FURTHER INDICATION FOR WLAN SENSING MEASUREMENT REPORT

(71) Applicant: MediaTek Inc., Hsinchu (TW)

(72) Inventors: Shuling Feng, San Jose, CA (US); Jianhan Liu, San Jose, CA (US); Thomas Edward Pare, Jr., San Jose, CA (US); Tsung-Han Tsai, Hsinchu (TW)

(73) Assignee: MediaTek Inc. (TW)

( * ) Notice: Subject to any disclaimer, the term of this patent is extended or adjusted under 35 U.S.C. 154(b) by 159 days.

(21) Appl. No.: 18/211,749

(22) Filed: Jun. 20, 2023

(65) Prior Publication Data

US 2023/0422070 A1 Dec. 28, 2023

Related U.S. Application Data

(60) Provisional application No. 63/368,087, filed on Jul. 11, 2022, provisional application No. 63/357,780, filed on Jul. 1, 2022, provisional application No. 63/356,086, filed on Jun. 28, 2022, provisional application No. 63/354,369, filed on Jun. 22, 2022.

(51) Int. Cl.
*H04W 24/10* (2009.01)
*H04W 84/12* (2009.01)

(52) U.S. Cl.
CPC ............ *H04W 24/10* (2013.01); *H04W 84/12* (2013.01)

(58) Field of Classification Search
CPC .... H04W 24/10; H04W 84/12; H04B 17/309; H04B 17/24; H04B 7/0626
See application file for complete search history.

(56) References Cited

U.S. PATENT DOCUMENTS

| 2023/0221423 | A1* | 7/2023 | Beg | G01S 7/006 342/27 |
| 2023/0300657 | A1* | 9/2023 | Suh | H04W 24/10 370/329 |
| 2024/0154681 | A1* | 5/2024 | Vieira | H04B 17/24 |
| 2024/0187905 | A1* | 6/2024 | Luo | H04W 74/0808 |
| 2024/0306020 | A1* | 9/2024 | Gao | H04W 24/08 |
| 2024/0357653 | A1* | 10/2024 | Luo | H04W 74/0816 |

OTHER PUBLICATIONS

European Patent Office, Extended European Search Report in European Patent Application No. 23180898.1, Nov. 17, 2023.

(Continued)

*Primary Examiner* — Habte Mered
(74) *Attorney, Agent, or Firm* — Andy M. Han; Han IP PLLC

(57) ABSTRACT

Techniques pertaining to further indication for WLAN sensing measurement report in wireless communications are described. A sensing receiver is configured to perform a sensing measurement and generate a sensing measurement report indicating channel state information (CSI) according to the sensing measurement. The sensing measurement report further indicates one or more categories of a frequency response of the sensing receiver without indicating any gain setting of the sensing receiver. The sensing receiver is also configured to transmit, as a sensing responder, the sensing measurement report to a sensing initiator.

11 Claims, 3 Drawing Sheets

(56) References Cited

OTHER PUBLICATIONS

Rui Du (Huawei): "Information Exchange of WLAN Sensing Link", IEEE Draft; 11-22-0647-05-00bf-information-exchange-of-wlan-sensing-link, IEEE-SA Mentor, Piscataway, NJ USA, vol. 802.11bf, No. 5, Jun. 10, 2022 (Jun. 10, 2022), pp. 1-15, XZP068190881.
Kirk Lin et al: "CR to change the SMS structures in TS of OpenCMAPI 1.0"; oma-cd-opencmapi-2013-0065r01-cr_ts_v1_0_sms_bug_fixes, Open Mobile Alliance (OMA), 4330 La Jolla Dr., Suite 110, San Diego, CA 92122; USA, Sep. 17, 2013 (Sep. 17, 2013), pp. 1-23, XP064138982.

\* cited by examiner

300

REQUEST, BY A SENSING INITIATOR, A SENSING MEASUREMENT REPORT FROM A SENSING RESPONDER

310

RECEIVE, BY THE SENSING INITIATOR, THE SENSING MEASUREMENT REPORT INDICATING CHANNEL STATE INFORMATION (CSI) ACCORDING TO A SENSING MEASUREMENT PERFORMED BY A SENSING RECEIVER OF THE SENSING RESPONDER, THE SENSING MEASUREMENT REPORT FURTHER INDICATING ONE OR MORE CATEGORIES OF A FREQUENCY RESPONSE OF THE SENSING RECEIVER WITHOUT INDICATING ANY GAIN SETTING OF THE SENSING RECEIVER

FURTHER INDICATION FOR WLAN SENSING MEASUREMENT REPORT

CROSS REFERENCE TO RELATED PATENT APPLICATION

The present disclosure is part of a non-provisional patent application claiming the priority benefit of U.S. Provisional Patent Application Nos. 63/354,369, 63/356,086, 63/357,780 and 63/368,087, filed 22 Jun. 2022, 28 Jun. 2022, 1 Jul. 2022 and 11 Jul. 2022, respectively, the contents of which herein being incorporated by reference in their entirety.

TECHNICAL FIELD

The present disclosure is generally related to wireless communications and, more particularly, to further indication for wireless local area network (WLAN) sensing measurement report in wireless communications.

BACKGROUND

Unless otherwise indicated herein, approaches described in this section are not prior art to the claims listed below and are not admitted as prior art by inclusion in this section.

In wireless communications, such as WiFi (or Wi-Fi) and WLANs in accordance with Institute of Electrical and Electronics Engineers (IEEE) 802.11, a sensing responder set up as a sensing receiver needs to transmit a WLAN sensing measurement report in sub-7 GHz sensing, including channel state information (CSI), to a sensing initiator if the sensing measurement report is negotiated during a sensing measurement setup. The receiver gain setting may vary for consecutive sensing instances for the same sensing setup. In order to receive packets with the same power level at a receiver antenna, a receiver's total gains may vary by a couple of decibels (dBs) due to accuracy of receiver power measurements and resulted gain adjustments, especially in a noisy environment, while each receiver chain may have its own AGC and gain value. The receiver total gain (Rx Gain) may include different gain stages with different gain resolutions, or even fractional dB resolutions. For instance, there may be low noise amplifier (LNA) gain and variable gain amplifier (VGA) gain in the receiver radio frequency (RF)/ analog front end. Additionally, there may be filter gain and digital gain adjustments in the digital baseband leading to CSI estimation. Moreover, Rx Gain may not be calibrated or certified, and receive gains from different vendors may not be compared or mix-used. Furthermore, some WLAN chip vendors may not be amenable to revealing details of receiver gain settings for design confidential concerns. As can be seen, receiver total gain variations tend to result in CSI measurement variations which cannot be ignored in sensing. Specifically, receiver gain variations may cause receiver normalized frequency response variations, which affects the accuracy of estimated sensing CSIs. CSI accuracy variations cannot be neglected in applications where small CSI variations need to be detected. Thus, it may be beneficial to report indications of receiver frequency response variations in sensing measurement report along with CSIs, thereby helping the sensing initiator in improving sensing performance. On the other hand, reporting receiver gain may not be appropriate for some vendors, and there are other underlying receiver circuit conditions which may cause receiver frequency response variations, such as bandwidth, temperature, interferences, and so on. Therefore, there is a need for a solution of further indication for WLAN sensing measurement report, such as Rx Gain and Rx Gain change, with CSI report.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to further indication for WLAN sensing measurement report in wireless communications. Thus, it is believed that various schemes proposed herein may address or otherwise alleviate aforementioned issue(s), such as reduction in performance overhead.

In one aspect, a method may involve performing a sensing measurement by a sensing receiver. The method may also involve generating a sensing measurement report indicating CSI according to the sensing measurement. The sensing measurement report may further indicate one or more categories of a frequency response of the sensing receiver without indicating any gain setting of the sensing receiver.

In another aspect, a method may involve a sensing initiator requesting a sensing measurement report from a sensing responder. The method may also involve the sensing initiator receiving the sensing measurement report indicating CSI according to a sensing measurement performed by a sensing receiver of the sensing responder. The sensing measurement report may further indicate one or more categories of a frequency response of the sensing receiver without indicating any gain setting of the sensing receiver.

In yet another aspect, a device may include a sensing receiver having circuitry configured to perform certain operations. For instance, the sensing receiver may perform a sensing measurement and generate a sensing measurement report indicating CSI according to the sensing measurement. The sensing measurement report may further indicate one or more categories of a frequency response of the sensing receiver without indicating any gain setting of the sensing receiver. The sensing receiver may also transmit, as a sensing responder, the sensing measurement report to a sensing initiator.

It is noteworthy that, although description provided herein may be in the context of certain radio access technologies, networks and network topologies such as, WLAN, the proposed concepts, schemes and any variation(s)/ derivative(s) thereof may be implemented in, for and by other types of radio access technologies, networks and network topologies such as, for example and without limitation, Bluetooth, Zig Bee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to further indication for WLAN sensing measurement report in wireless communications. According to the present disclosure, a number of possible solutions may be implemented separately or jointly. That is, although these possible solutions may be described below separately, two or more of these possible solutions may be implemented in one combination or another.

Each of the various proposed schemes in accordance with the present disclosure may be utilized to indicate a sensing receiver's frequency response change(s) without reporting actual gain settings of the sensing receiver. The accuracy of reported CSIs in IEEE 802.11 sub-7 GHz sensing may be affected by receiver frequency response variations caused by receiver gain setting changes. Under the proposed schemes, the indication of changes of the receiver's frequency response may be reported along with CSIs for each sensing instance. Advantageously, this indication may be used by a sensing initiator to improve sensing performance.

Figure 1:
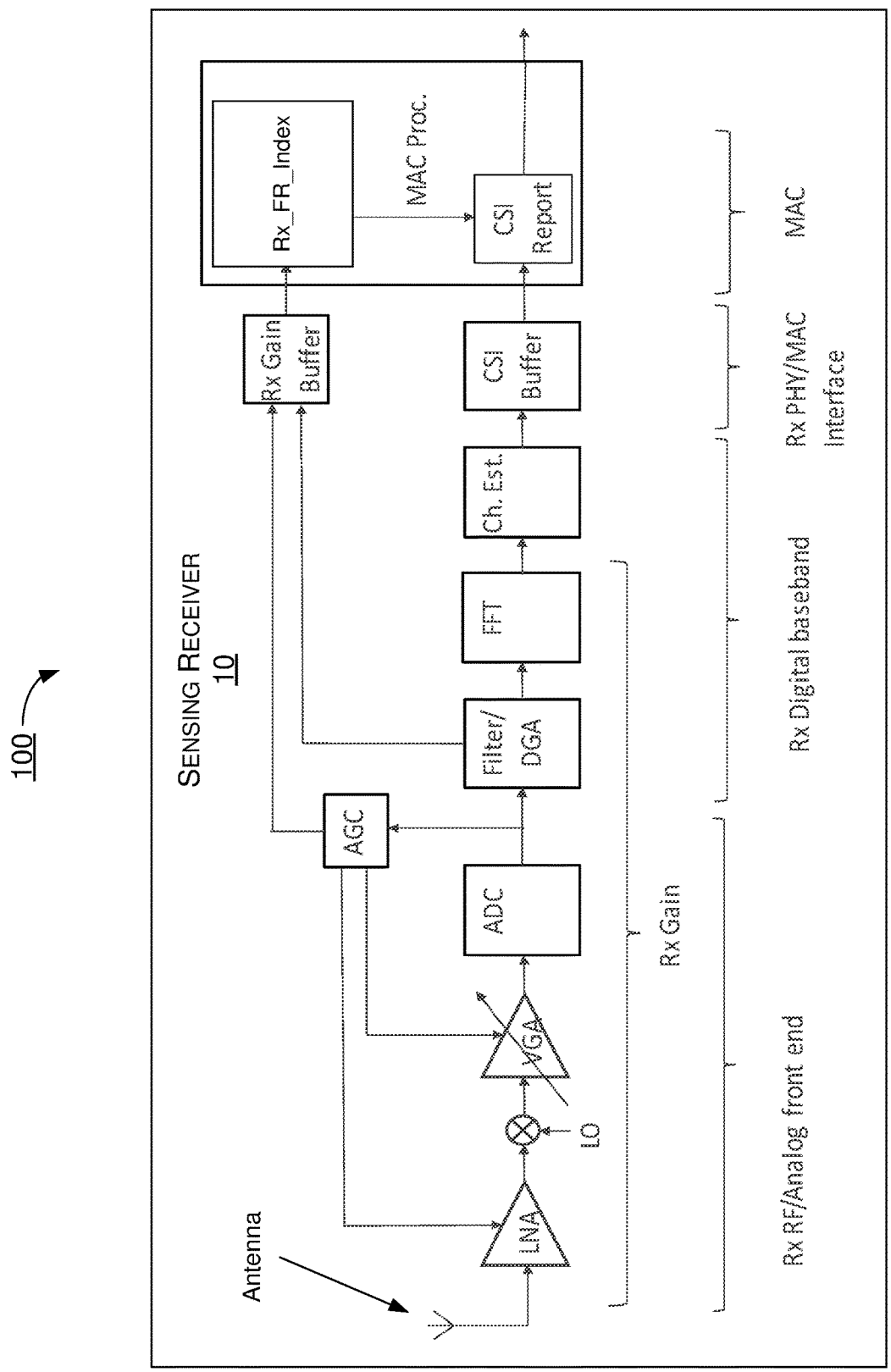
FIG. 1 is a schematic diagram of an example design based on which various proposed schemes in accordance with the present disclosure may be implemented.

FIG. 1 illustrates of an example design 100 based on which various proposed schemes in accordance with the present disclosure may be implemented. In particular, FIG. 1 shows an IEEE 802.11 sensing receiver block diagram under design 100 with CSI report medium access control layer (MAC) and physical layer (PHY) interface. In design 100, the RX_FR_Index model inside the MAC may output a Rx_FR_Change, a Rx_FR_Index and/or FR_Report plus Rx_FR_Index, as described below.

Referring to FIG. 1, in design 100, the sensing receiver block may be implemented in a sensing receiver 10. Sensing receiver 10 may include a Rx RF/analog front end, a Rx digital baseband portion, a Rx PHY-to-MAC interface, and a MAC processing portion. The Rx RF/analog front end may include one or more antennae, an LNA, a local oscillator (LO), a VGA, an analog-to-digital (ADC) converter and an automatic gain control (AGC) circuit. The Rx digital baseband portion may include a filter/digital gain amplifier (DGA), a fast Fourier transform (FFT) circuit and a channel estimation circuit. The PHY-to-MAC interface may include a CSI buffer and a Rx gain buffer. The MAC processing portion may include a CSI report generation circuit and an indication generation circuit. The indication generation circuit may receive information/data from the Rx gain buffer to generate further indication(s) (e.g., Rx_FR_Change, Rx_FR_Index and FR_Report) regarding sensing receiver 10's frequency response changes without reporting actual gain setting(s) of sensing receiver 10 under various proposed schemes in accordance with the present disclosure. The outputs of indication generator and the CSI buffer may be provide to the CSI report generation circuit to generate a CSI report, with the addition of Rx_FR_Change or Rx_FR_Index or both of FR_Report and Rx_FR_Index, to be reported to a sensing initiator.

Under a first proposed scheme in accordance with the present disclosure, a 1-bit indication (Rx_FR_Change) may be added, along with CSI for sensing measurement report, to indicate change or no change in the receiver frequency response. For instance, Rx_FR_Change may be used to indicate changes of normalized receiver frequency response. Notably, LNA switches and/or VGA adjustments may cause RF and/or analog filter change and, thus, may result in changes of normalized receiver frequency response. The indicated receiver frequency response changes may refer to a previous sensing null data packet (NDP) for the same sensing measurement setup in a sensing session. For instance, a value of "1" of Rx_FR_Change may indicate that there is a change from the previous sensing NDP, and a value of "0" of Rx_FR_Change may indicate that there is no change from the previous sensing NDP. On the receiving end, the sensing initiator may decode the Rx_FR_Change field along with CSI during a sensing measurement report phase. If Rx_FR_Change=0, a current CSI may be combined with any previous CSI(s) for better sensing performance, or it may be compared with previous CSI(s) for sensing detection if necessary. This Rx_FR_Change field may be useful in cases in which small CSI variations need to be detected. Depending on types of applications, the sensing initiator may choose to combine or compare CSIs and ignore Rx_FR_Change indication after assessing CSI variation risks caused by receiver gain changes.

Under a second proposed scheme in accordance with the present disclosure, an indication (Rx_FR_Index) may be added to indicate categories of receiver frequency response. That is, Rx_FR_Index may be added to CSIs reported to a sensing initiator during a measurement report phase to indicate categories of receiver frequency response. A pre-fixed or predetermined value (e.g., FR_Invalid) of Rx_FR_Index may indicate that a receiver frequency response category report is not available. For instance, by setting to a pre-fixed value of FR_Invalid, the Rx_FR_Index may indicate that the receiver frequency response category report is not available. It is noteworthy that some chip vendors may not categorize their receiver frequency responses. They may use FR_Invalid value to indicate that receiver frequency response categorization is not available and Rx_FR_Index field does not carry any valid frequency response category information from the receiver. For example, Rx_FR_Index=FR_Invalid=0 may indicate that the receiver frequency response category is not available.

Under the proposed scheme, Rx_FR_Index values other than FR_Invalid may indicate different categories of normalized receiver frequency response. For instance, some receiver RF and analog gain changes may cause normalized estimated CSI variations and, thus, may result in normalized receiver frequency responses falling into different categories. Chip vendors may categorize these frequency response variations and, accordingly, may assign a Rx_FR_Index value other than FR_Invalid to each of these categories. Under the proposed scheme, Rx_FR_Index may comprise 1 N bits, with N being an integer number up to 8. For instance, a 3-bit Rx_FR_Index field may indicate a number of receiver frequency response categories, ranging from 1 to 7, and Rx_FR_Index=0 may indicate that receiver frequency response categorization is not available.

Under the proposed scheme, flexibility is provided for chip vendors to define their Rx_FR_Index values depending on normalized Rx frequency response variations. For instance, in case that a receiver has four major different normalized frequency response variations, a chip vendor may categorize these major variations and their underlying circuit conditions into four categories by mapping these four categories of variations to respective four values other than FR_Invalid of Rx_FR_Index. In case that a receiver does not have normalized frequency response variation issues across all gain settings of sensing receiver 10, the chip vendor may set Rx_FR_Index to a fixed number other than FR_Invalid. Alternatively, the chip vendor may choose not to categorize the receiver frequency response, and may set Rx_FR_Index=FR_Invalid to indicate this status.

Upon receiving the indication, the sensing initiator may decode Rx_FR_Index along with CSI during a sensing measurement report phase. CSIs with the same Rx_FR_Index value other than FR_Invalid may be generated with the same category of normalized receiver frequency response, and they may be combined for better sensing performance or compared for sensing detection if necessary. Depending on types of applications, the sensing initiator may assess CSI variation risks caused by receiver frequency response changes. In an event that the risk is determined to be low, the sensing initiator may choose to combine or compare CSIs with different values of Rx_FR_Index, or with value of FR_Invalid. Under the proposed scheme, this Rx_FR_Index field may be useful in cases where small CSI variations need to be detected. Moreover, Rx_FR_Index mapping may be determined by receiver, and the sensing initiator does not need mapping rules to use Rx_FR_Index.

Under a third proposed scheme in accordance with the present disclosure, a dedicated bit (FR_Report) may be added to indicate whether a receiver frequency response category report is available. Moreover, a field of Rx_FR_Index may be added to CSIs reported to a sensing initiator during a measurement report phase to indicate categories of the receiver frequency response. Under the proposed scheme, the dedicated bit of FR_Report may be set to a pre-fixed or predetermined value (e.g., 0 or 1) to indicate whether the receiver frequency response category report is available.

It is noteworthy that some chip vendors may not categorize their receiver frequency responses and, in such cases, they may indicate that the receiver frequency response categorization is not available by setting FR_Report to 0, with Rx_FR_Index field not carrying any valid information from the receiver. For instance, a chip vendor may set FR_Report to 0 to indicate that the receiver frequency response category is not available or, alternatively, may set FR_Report to 1 to indicate that the receiver frequency response category information is reported in the Rx_FR_Index field.

Under the proposed scheme, Rx_FR_Index may be utilized to indicate different categories of normalized receiver frequency response. For instance, some receiver RF and analog gain changes may cause normalized estimated CSI variations and, thus, may result in normalized Rx frequency responses falling into different categories. Chip vendors may categorize these frequency responses, assign a Rx_FR_Index value to each of these categories, and set FR_Report to 1 to indicate that receiver frequency response category information is reported in the Rx_FR_Index field. Moreover, Rx_FR_Index may comprise 1 N bits, with N being an integer number up to 8. For instance, a 3-bit Rx_FR_Index field may indicate up to eight different receiver frequency response categories.

Under the proposed scheme, flexibility is provided for chip vendors to define their Rx_FR_Index values depending on normalized Rx frequency response variations. For instance, in case that a receiver has four major different normalized frequency response variations, a chip vendor may categorize these major variations and their underlying circuit conditions into four categories by mapping these four categories of variations to respective four values of Rx_FR_Index. In case that a receiver does not have normalized frequency response variation issues across all gain settings of sensing receiver 10, the chip vendor may set Rx_FR_Index to a fixed number.

Upon receiving the indication, the sensing initiator may decode FR_Report and Rx_FR_Index along with CSI during a sensing measurement report phase. When FR_Report=1, CSIs with the same Rx_FR_Index value may be generated with the same category of normalized receiver frequency response, and they may be combined for better sensing performance or compared for sensing detection if necessary. Depending on types of applications, the sensing initiator may assess CSI variation risks caused by receiver frequency response changes. In an event that the risk is determined to be low, the sensing initiator may choose to combine or compare CSIs with different values of Rx_FR_Index, or with even when FR_Report=0. Under the proposed scheme, this Rx_FR_Index field may be useful in cases where small CSI variations need to be detected. Moreover, Rx_FR_Index mapping may be determined by receiver, and the sensing initiator does not need mapping rules to use Rx_FR_Index.

Illustrative Processes

Figure 2:
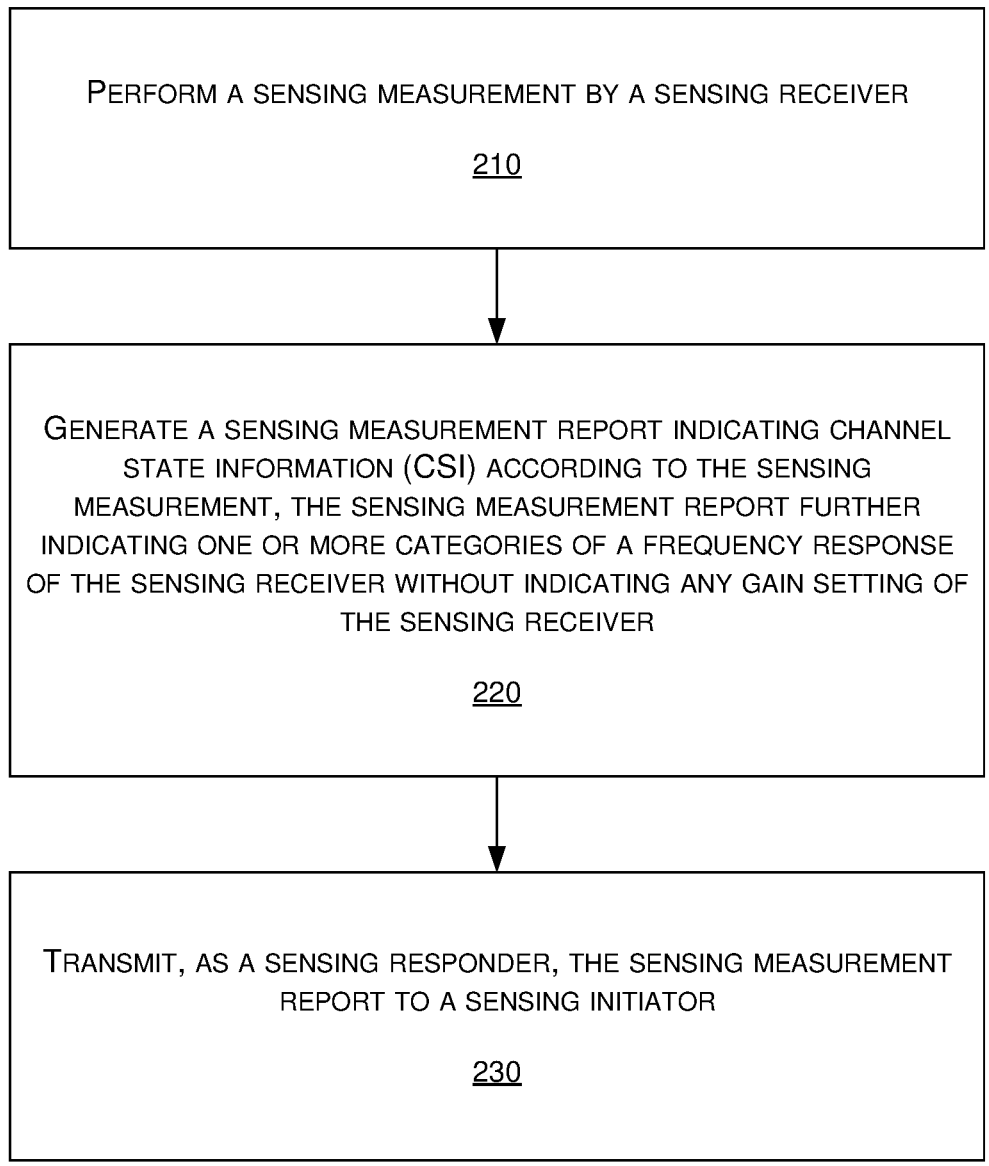
FIG. 2 is a flowchart of an example process in accordance with an implementation of the present disclosure.

FIG. 2 illustrates an example process 200 in accordance with an implementation of the present disclosure. Process 200 may represent an aspect of implementing various proposed designs, concepts, schemes, systems and methods described above. More specifically, process 200 may represent an aspect of the proposed concepts and schemes pertaining to further indication for WLAN sensing measurement report in wireless communications in accordance with the present disclosure. Process 200 may include one or more operations, actions, or functions as illustrated by one or more of blocks 210, 220 and 230. Although illustrated as discrete blocks, various blocks of process 200 may be divided into additional blocks, combined into fewer blocks, or eliminated, depending on the desired implementation. Moreover, the blocks/sub-blocks of process 200 may be executed in the order shown in FIG. 2 or, alternatively in a different order. Furthermore, one or more of the blocks/sub-blocks of process 200 may be executed repeatedly or iteratively. Process 200 may be implemented by or in sensing receiver 10 in which design 100 is implemented. Solely for illustrative purposes and without limiting the scope, process 200 is described below in the context of design 100 as implemented in sensing receiver 10 of a station (STA) (e.g., access point (AP) STA or non-AP STA) in a WLAN. Process 200 may begin at block 210.

At 210, process 200 may involve sensing receiver 10 performing a sensing measurement. Process 200 may proceed from 210 to 220.

At 220, process 200 may involve sensing receiver 10 generating (e.g., using the CSI report generation circuit) a sensing measurement report indicating CSI according to the sensing measurement. The sensing measurement report may indicate one or more categories of a frequency response of the sensing receiver without indicating any gain setting of the sensing receiver. Process 200 may proceed from 220 to 230.

At 230, process 200 may involve sensing receiver 10, as a sensing responder, transmitting the sensing measurement report to a sensing initiator.

In some implementations, the sensing measurement report may include an additional field (Rx_FR_Index) that indicates the one or more categories of frequency response of the sensing receiver.

In some implementations, in generating the sensing measurement report, process 200 may involve sensing receiver 10 assigning a value to the additional field corresponding to the one of one or more categories due to a variation in a normalized frequency response of the sensing receiver.

In some implementations, a predetermined value (FR_Invalid) of the additional field may indicate that a receiver frequency response category report is not available. In some implementations, another value different than the predetermined value of the additional field may indicate different categories of a normalized frequency response of the sensing receiver. Alternatively, or additionally, the predetermined value may be 0 (FR_Invalid=0), and the additional field may indicate that there is no receiver frequency response category report with Rx_FR_Index=FR_Invalid=0.

In some implementations, the additional field may include at least one bit and up to N bits, N≤8.

FIG. 3 illustrates an example process 300 in accordance with an implementation of the present disclosure. Process 300 may represent an aspect of implementing various proposed designs, concepts, schemes, systems and methods described above. More specifically, process 300 may represent an aspect of the proposed concepts and schemes pertaining to further indication for WLAN sensing measurement report in wireless communications in accordance with the present disclosure. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed repeatedly or iteratively. Process 300 may be implemented by or in a sensing initiator. Solely for illustrative purposes and without limiting the scope, process 300 is described below in the context of sensing initiator as part of a STA (e.g., AP STA or non-AP STA) in a WLAN. Process 300 may begin at block 310.

At 310, process 300 may involve the sensing initiator requesting a sensing measurement report from a sensing responder (e.g., sensing receiver 10). Process 300 may proceed from 310 to 320.

At 320, process 300 may involve the sensing initiator receiving the sensing measurement report indicating CSI according to a sensing measurement performed by sensing receiver 10. The sensing measurement report may further indicate one or more categories of a frequency response of sensing receiver 10 without indicating any gain setting of the sensing receiver.

In some implementations, the sensing measurement report may include an additional field (Rx_FR_Index) that indicates the one or more categories of frequency response of the sensing receiver.

In some implementations, a predetermined value (FR_Invalid) of the additional field may indicate that a receiver frequency response category report is not available. In some implementations, another value different than the predetermined value of the additional field may indicate different categories of a normalized frequency response of the sensing receiver. Alternatively, or additionally, the predetermined value may be 0 (FR_Invalid=0), and the additional field may indicate that there is no receiver frequency response category report with Rx_FR_Index=FR_Invalid=0.

In some implementations, the additional field may include at least one bit and up to N bits, N≤8.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
performing a sensing measurement by a sensing receiver; and
generating a sensing measurement report indicating channel state information (CSI) according to the sensing measurement, the sensing measurement report further indicating one or more categories of a frequency response of the sensing receiver without indicating any gain setting of the sensing receiver,
wherein the sensing measurement report comprises an additional field that indicates the one or more categories of frequency response of the sensing receiver,
wherein a predetermined value of the additional field indicates that a receiver frequency response category report is not available, and
wherein another value different than the predetermined value of the additional field indicates different categories of a normalized frequency response of the sensing receiver.

2. The method of claim 1, wherein the generating of the sensing measurement report comprises assigning a value to the additional field corresponding to the one of one or more categories due to a variation in a normalized frequency response of the sensing receiver.

3. The method of claim 1, wherein the predetermined value is 0, and wherein the additional field indicates that there is no receiver frequency response category report with 0.

4. The method of claim 1, wherein the additional field comprises at least one bit and up to N bits, N≤8.

5. The method of claim 1, further comprising:
transmitting, as a sensing responder, the sensing measurement report to a sensing initiator.

6. A method, comprising:
requesting, by a sensing initiator, a sensing measurement report from a sensing responder; and
receiving, by the sensing initiator, the sensing measurement report indicating channel state information (CSI) according to a sensing measurement performed by a sensing receiver of the sensing responder, the sensing measurement report further indicating one or more categories of a frequency response of the sensing receiver without indicating any gain setting of the sensing receiver,
wherein the sensing measurement report comprises an additional field that indicates the one or more categories of frequency response of the sensing receiver,
wherein a predetermined value of the additional field indicates that a receiver frequency response category report is not available, and
wherein another value different than the predetermined value of the additional field indicates different categories of a normalized frequency response of the sensing receiver.

7. The method of claim 6, wherein the predetermined value is 0, and wherein the additional field indicates that there is no receiver frequency response category report with 0.

8. The method of claim 6, wherein the additional field comprises at least one bit and up to N bits, N≤8.

9. A device, comprising:
a sensing receiver comprising circuitry configured to perform operations comprising:
performing a sensing measurement;
generating a sensing measurement report indicating channel state information (CSI) according to the sensing measurement, the sensing measurement report further indicating one or more categories of a frequency response of the sensing receiver without indicating any gain setting of the sensing receiver; and
transmitting, as a sensing responder, the sensing measurement report to a sensing initiator,
wherein the sensing measurement report comprises an additional field that indicates the one or more categories of frequency response of the sensing receiver,
wherein a predetermined value of the additional field indicates that a receiver frequency response category report is not available, and
wherein another value different than the predetermined value of the additional field indicates different categories of a normalized frequency response of the sensing receiver.

10. The device of claim 9, wherein the predetermined value is 0, and wherein the additional field indicates that there is no receiver frequency response category report with 0.

11. The device of claim 9, wherein the additional field comprises at least one bit and up to N bits, N≤8.

* * * * *